US012747303B2

(12) United States Patent
Antonietti et al.

(10) Patent No.: US 12,747,303 B2
(45) Date of Patent: Sep. 29, 2026

(54) EFFICIENT GREEN PROCESS FOR THE PREPARATION OF NANOCELLULOSES, NOVEL MODIFIED NANOCELLULOSES AND THEIR APPLICATION

(71) Applicant: MAX-PLANCK-GESELLSCHAFT ZUR FORDERUNG DER WISSENSCHAFTEN E.V., Munich (DE)

(72) Inventors: Markus Antonietti, Nuthetal (DE); Svitlana Filonenko, Potsdam (DE); Esther Elisabeth Jaekel, Potsdam (DE)

(73) Assignee: MAX-PLANCK-GESELLSCHAFT ZUR FORDERUNG DER WISSENSCHAFTEN E.V., Munich (DE)

( * ) Notice: Subject to any disclaimer, the term of this patent is extended or adjusted under 35 U.S.C. 154(b) by 640 days.

(21) Appl. No.: 18/023,175

(22) PCT Filed: Aug. 27, 2020

(86) PCT No.: PCT/EP2020/073959

§ 371 (c)(1),
(2) Date: Feb. 24, 2023

(87) PCT Pub. No.: WO2022/042842

PCT Pub. Date: Mar. 3, 2022

(65) Prior Publication Data

US 2023/0322962 A1 Oct. 12, 2023

(51) Int. Cl.
*C08B 15/08* (2006.01)
*C08B 15/06* (2006.01)

(52) U.S. Cl.
CPC .............. *C08B 15/08* (2013.01); *C08B 15/06* (2013.01)

(58) Field of Classification Search
CPC .......... C08B 15/08; C08B 15/06; D21C 9/002
See application file for complete search history.

(56) References Cited

U.S. PATENT DOCUMENTS 2,976,183 A 3/1961 Arthur

FOREIGN PATENT DOCUMENTS

| | | | |
|---|---|---|---|
| EP | 3409691 | A1 | 12/2018 |
| WO | 2012145522 | A2 | 10/2012 |

OTHER PUBLICATIONS

Chen et al., J. Chem. Technol. Biotechnol., 2018, 93, p. 3452-3461. (Year: 2018).*

Tao et al., Nanoscale Horiz., 2020, 5, p. 607-627, First published Jan. 31, 2020. (Year: 2020).*

Sirviö et al., Biomacromolecules, 2016, 17, p. 3025-3032. (Year: 2016).*

International Search Report mailed May 6, 2021; International Application No. PCT/EP2020/073959; International Filing Date Aug. 27, 2020 (6 pgs).

Written Opinion mailed May 6, 2021; International Application No. PCT/EP2020/073959; International Filing Date Aug. 27, 2020 (9 pgs).

* cited by examiner

*Primary Examiner* — Jonathan S Lau

(74) *Attorney, Agent, or Firm* — CANTOR COLBURN LLP

(57) ABSTRACT

The present disclosure relates to an efficient process for the preparation of nanocelluloses using mixtures of ammonium formate and at least one acid as reactant and solvent as well as to novel modified nanocelluloses and their applications.

20 Claims, 3 Drawing Sheets

EFFICIENT GREEN PROCESS FOR THE PREPARATION OF NANOCELLULOSES, NOVEL MODIFIED NANOCELLULOSES AND THEIR APPLICATION

CROSS-REFERENCE TO RELATED APPLICATION

This application is a National Stage application of PCT/EP2020/073959, filed Aug. 27, 2020.

TECHNICAL FIELD

The present disclosure relates to an efficient process for the preparation of nanocelluloses using mixtures of ammonium formate and at least one acid as reactant and solvent as well as to novel modified nanocelluloses and their applications.

BACKGROUND

Cellulose, a linear polymer of β(1,4) linked D-glucose units, is the most available polymer on earth and due to its biocompatibility, non-toxicity and extraordinary mechanical properties used in a myriad of applications. Isolation of cellulose, in particular from plant fibers, typically involves chemical treatments consisting of alkaline extraction and bleaching.

In the past decade, the preparation and new applications of so-called nanocelluloses have gained significant interest. The term nanocelluloses is frequently used for cellulose materials with at least one dimension in the nano-scale. Their unique combination of cellulose properties with the features of nanomaterials open new horizons in material sciences.

Today, there exist three major types of nanocellulose materials: bacterial nanocellulose (BNC), mechanically delaminated cellulose nanofibers (CNF), and hydrolytically extracted cellulose nanocrystals (CNC) (see the following overviews: Klemm et al., "Nanocelluloses: A New Family of Nature-Based Materials", Angew. Chem. Int. Ed. 2011, 50, p. 5438 to 5466; A. Dufresne, "Nanocellulose: a new ageless bionanomaterial", Materials Today, Vol. 16, No. 6, 2013 and Klemm et al., "Nanocellulose as a naturalsource for groundbreaking applications in materials science: Today's state", Materials Today, Vol 21, Number 7, 2018).

Though their manufacture due to low space-time yields is quite costly, BNCs are typically obtained in such high purity to be applied i.e. in medical applications even without tedious purification procedures. The most commonly employed bacteria are acetic acid bacteria of the genus Gluconacetobacter. During biosynthesis, cellulose chains are produced and aggregated in fibrils with cross sectional dimensions typically ranging from 2 to 20 nm and having a degree of polymerization of 4,000 to 10,000 glucose units. Such fibrils usually exhibit a small number of defects or amorphous domains.

CNFs are most commonly and at larger scale manufactured from delignified and preferably bleached pulps. Mechanical delamination of the fibers is effected, e.g. by using high-pressure homogenizers, microfluidizers, common refiners, high speed blenders and extruders or techniques such as ball milling, steam explosion and ultrasonification. These processes are quite simple, but require high energy input, damage the fibers, and produce CNF with broad distribution in fibril diameter and length. Generally, CNFs exhibit a diameter of 5 to 60 nm and a length of 100 nm to 10 mm with a degree of polymerization of 500 or more.

Isolation of CNCs from wood pulp and cotton via acid hydrolysis using sulfuric acid was first reported in the 1940s. It is well understood that acids degrade more accessible and/or disordered cellulose domains leaving the highly crystalline domains intact. CNCs typically have dimensions of 100 to 250 nm in length and 5 to 70 nm in diameter with a degree of polymerization of 500 to 15,000.

Newer methods to isolate CNCs include oxidation and hydrolysis with acids such as hydrochloric, hydrobromic, citric or phosphoric acid. The choice of acid directly affects the colloidal and thermal stability, size, and surface charge of the CNCs. For example, phosphoric and hydrochloric acid hydrolyses yield CNCs with low or no charge content and the CNCs are typically aggregated but have higher thermal stability. It is therefore important to optimize reaction conditions for each isolation procedure in order to ensure that stable and predictable nanomaterials are prepared. The most common starting materials for CNCs are wood pulp and cotton but also algae, bacteria and tunicate and waste materials such as coconut husk and rice husk as well as banana pseudostems.

However, despite their huge potential in various applications a major drawback for commercial implementation of nanocelluloses, has been the very high energy consumption, in particular CNFs and CNCs, their poor long-term stability and storability were also found to present a crucial problem.

As a consequence, various attempts have been made to overcome these problems.

Such attempts include pretreatments such as mechanical cutting, acid hydrolysis, enzymatic pretreatment and the introduction of charged groups through carboxymethylation or 2,2,6,6-tetramethylpiperidine-1-oxyl (TEMPO)-mediated oxidation aiding the disintegration by electrostatic repulsion (see Klemm et al., "Nanocellulose as a natural source for groundbreaking applications in materials science: Today's state", Materials Today, Vol 21, Number 7, 2018 and literature cited therein, US 2014/0155301 A1, US 2015/0171679 and CN 102180979B).

A similar approach was disclosed by K. Watanabe et al., Cytotechnology 13 (1993) 107-114, where cellulose was chemically modified by introducing cationic surface charges such as trimethylammonium hydroxypropyl-, diethyl aminoethyl-, aminoethyl- and carboxymethyl-groups.

Further advanced approaches include pre-treatment or preparation methods using ionic liquids or deep eutectic solvents as reaction media (an overview is given in H. Tadesse and R. Luque, "Advances on biomass pretreatment using ionic liquids", Energy Environ. Sci., 2011, 4, 3913).

In Li et al., "Recyclable deep eutectic solvent for the production of cationic nanocelluloses", Carbohydrate Polymers, Vol. 199, 1, 2018, p. 219-227 novel modified nanocelluloses bearing guanidinium groups are disclosed, which are prepared by a two-step procedure comprising cationization of dialdehyde celluloses with aminoguanidine hydrochloride and glycerol, a deep eutectic solvent, which acts as reagent and reaction medium followed my mechanical disintegration. The starting materials, dialdehyde celluloses, were prepared by oxidation of cellulose (bleached kraft birch pulp) with sodium periodate.

The oxidation and modification procedure employs expensive chemicals and weakens the mechanical integrity of the cellulose, thus preventing commercial application.

Using ammonium formate both as reagent and reaction media for the conversion of carbohydrates into valuable fine chemicals is known from S. Filonenko, A. Voelkel and M. Antonietti, "Valorization of monosaccharides towards fructopyrazines in a new sustainable and efficient eutectic medium" Green Chem., 2019, 21, 5256.

Despite the aforementioned advances there was still need to provide an efficient, green process for the preparation of nanocellulose materials starting from readily available compounds without the need to involve toxic or hazardous reagents.

A further object of the disclosure was to provide nanocellulose with an increased stability, i.e. reduced tendency to irreversibly agglomerate when applied as dispersions or colloids.

BRIEF SUMMARY

According to one aspect of the disclosure, there is now provided a process for the preparation of nanocellulose comprising at least the steps of a) providing a mixture comprising i) ammonium formate ii) at least one acid and iii) at least one cellulose containing feedstock b) heating the mixture provided in step a) at a reaction temperature of 100° C. or more.

In further aspects the disclosure encompasses nanocellulose obtained by the aforementioned process and their applications.

DETAILED DESCRIPTION

Figure 1:
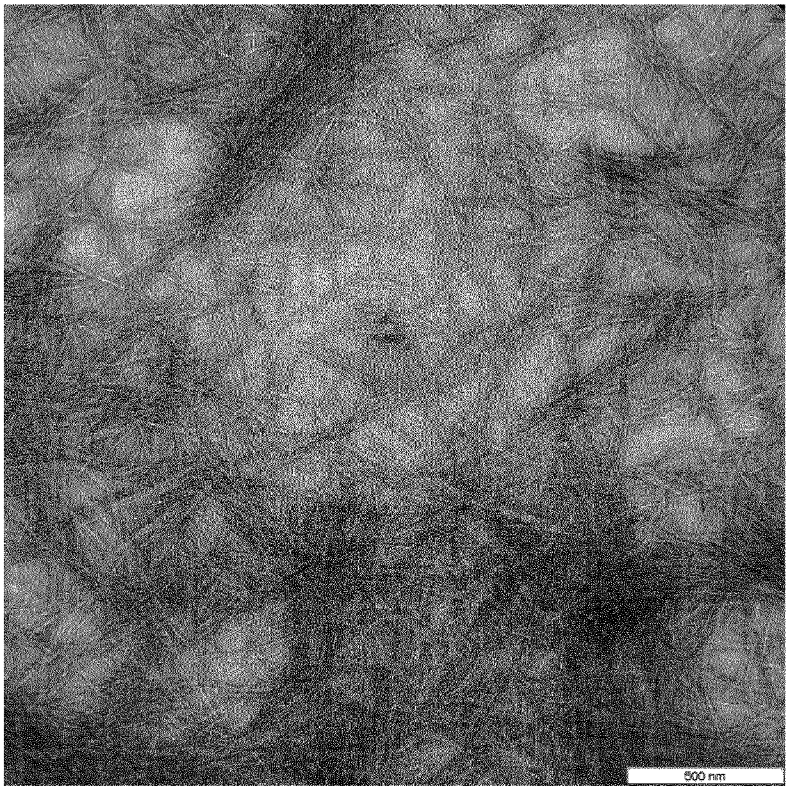
FIGS. 1 and 2 show TEM images of nanocellulose prepared from microcrystalline cellulose according to above example 1. Whiskers with dimensions of 10 to 20 nm in diameter and up to 200 nm length are obtained thereby.
Figure 2:
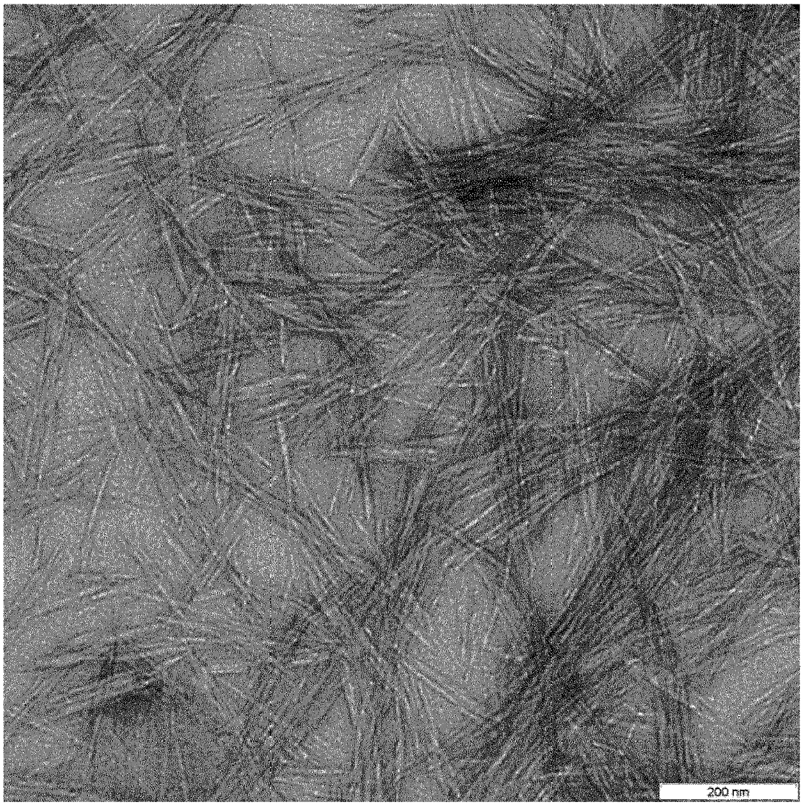
Figure 3:
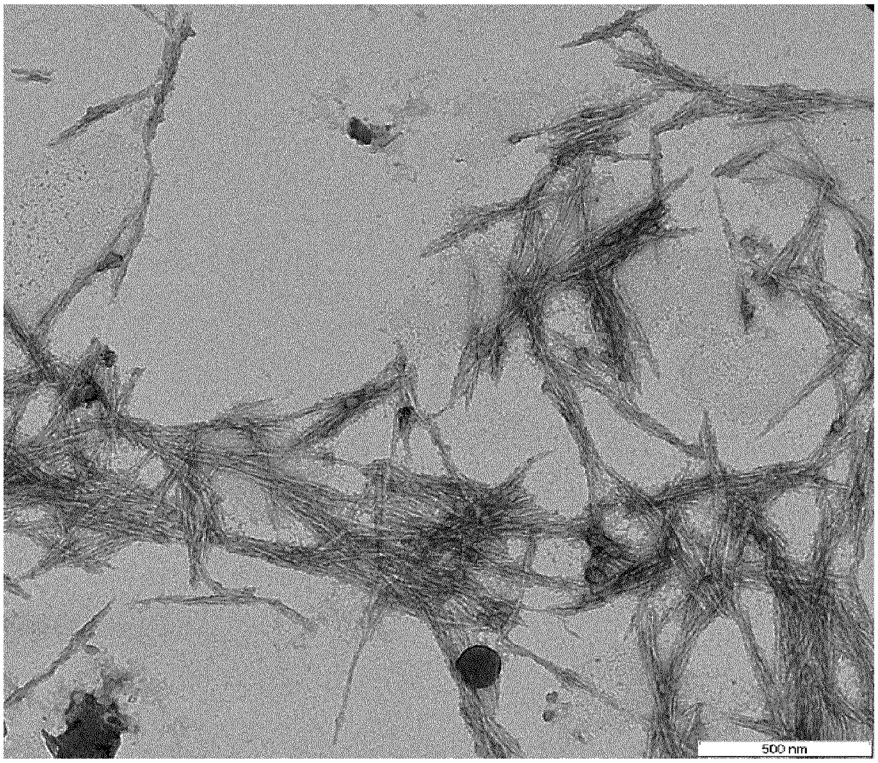
FIGS. 3 and 4 show TEM images of nanocellulose prepared from softwood pulp according to above example 6.
Figure 4:
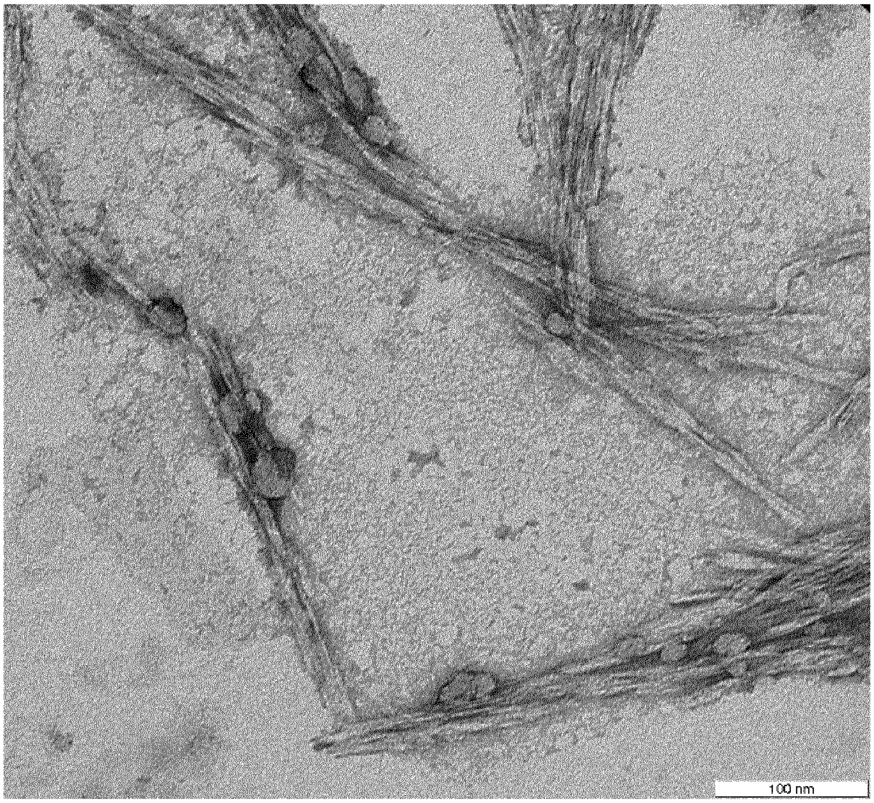
Figure 5:
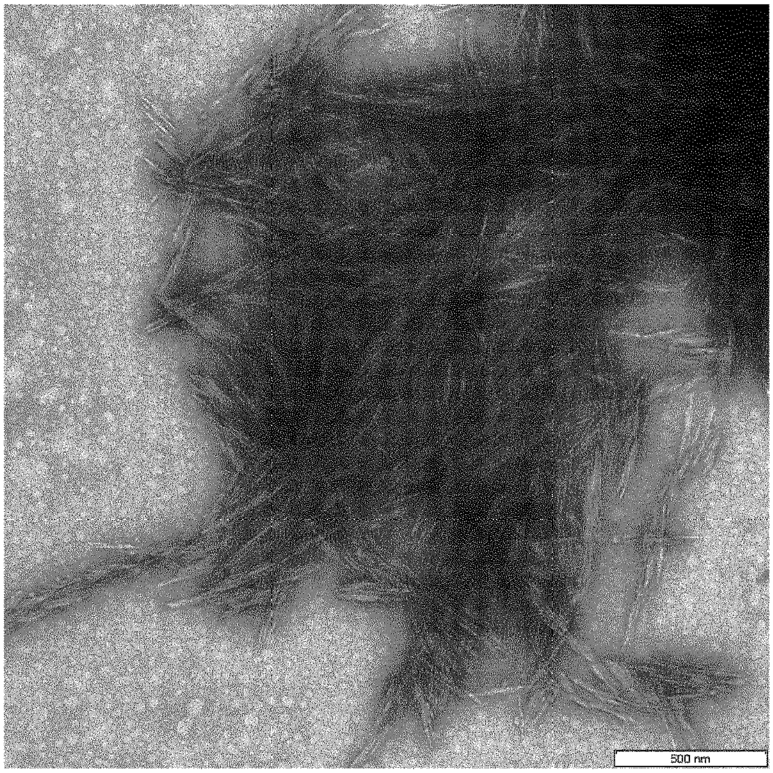
FIGS. 5 and 6 show TEM images of nanocellulose prepared from delignified pulp according to above example 11.
Figure 6:
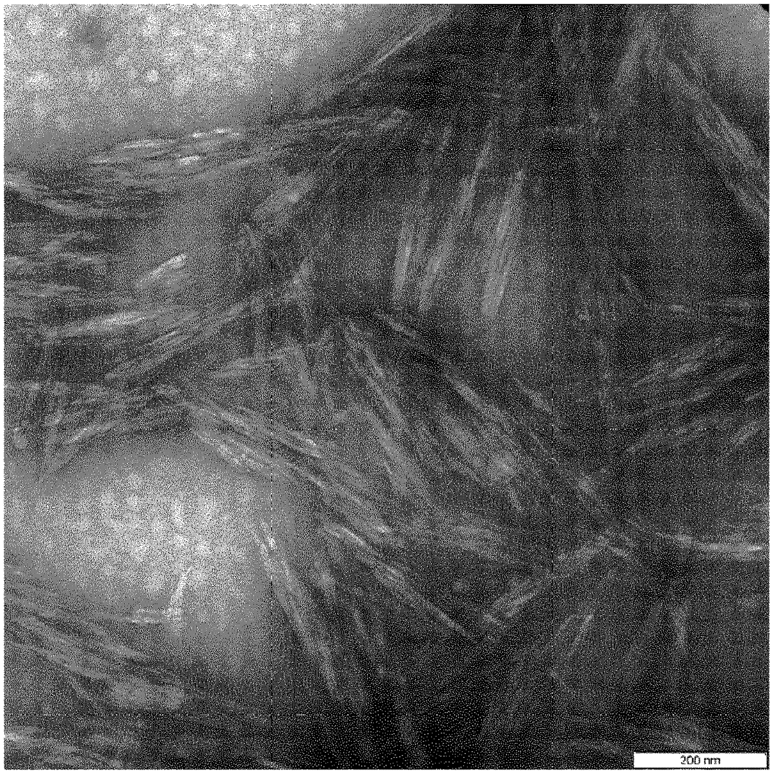

The disclosure also encompasses all combinations of preferred embodiments, ranges parameters as disclosed hereinafter with either each other or the broadest disclosed range or parameter.

Whenever used herein the terms "including", "for example", "e.g.", "such as" and "like" are meant in the sense of "including but without being limited to" or "for example without limitation", respectively.

As used herein the term nanocellulose denotes polymer particles comprising β(1,4) linked D-glucose units having an average degree of polymerization of at least 50 D-glucose units with at least one dimension being smaller than 1000 nm. Such nanocelluloses may be chemically derivatized or not.

In one embodiment the average degree of polymerization is from 100 to 15,000, preferably from 200 to 10,000.

For the avoidance of doubt the specification "at least one dimension being smaller than 1000 nm" includes particles having an average cross section of 3 to 200 nm, preferably in the range of 5 to 100 nm, more preferably in the range of 5 to 30 nm and most preferably in the range of 5 to 20 nm and an average length of 15 to 5000 nm, preferably in the range of 50 to 1000 nm, more preferably 70 to 800 nm.

In one embodiment the aspect ratio i.e. the ratio between length and cross section of the nanocellulose is larger than 1, preferably 2 or more, more preferably 2 to 100 or 2 to 50.

In step a) of the process a mixture comprising i) ammonium formate ii) at least one acid and iii) at least one cellulose containing feedstock is provided.

Suitable acids include organic acids such as organic compounds bearing one, two or three carboxylic acid (—COOH) or sulfonic acid groups and inorganic acids such as sulfuric acid, hydrohalic acids, perhalic acids and phosphoric acid.

Preferred acids are mono- and dicarboxylic acids such as formic acid, acetic acid, propionic acid, glycolic acid, lactic acid, oxalic acid, levulinic acid, malonic acid, succinic acid, malic acid, maleic acid and adipic acid, whereby formic acid, propionic acid, glycolic acid, lactic acid, levulinic acid and succinic acid are even more preferred.

It is an important finding of the disclosure that mixing ammonium formate and organic acids leads to a significant decrease in the melting point of the mixture compared to the single components, so that the mixture may serve as a reagent and as a solvent simultaneously without the necessity to add further other solvents. These so-called deep eutectic mixtures facilitate handling and increase solubility of the cellulose containing feedstock.

In one embodiment the molar ratio between ammonium formate and the sum of acids is for example from 0.2 to 1000, preferably from 0.5 to 10.0, more preferably from 1.0 to 5.0 and even more preferably from 2.0 to 2.5.

Higher and lower molar ratios are in principle possible but provide no advantage.

Therefore the disclosure also encompasses the use of ammonium formate and mixtures thereof with organic acids to prepare nanocelluloses.

The mixture provided in step a) further comprises a cellulose containing feedstock.

As used herein cellulose containing feedstock includes any feedstock containing cellulose whether bound to lignin and/or hemicelluloses and/or other structural building blocks or not.

Examples include microcrystalline cellulose, microbial cellulose, cellulose derived from marine or other invertebrates, recycling or waste paper such as office waste paper and municipal waste paper, wood pulp such as softwood and hardwood pulp whether bleached or not, chemical (dissolving) pulp, delignified pulp, pulp rejects, native biomass in the form of plant fibres, wood chips, saw dust, straw, leaves, stems or husks and cellulosic synthetic fibres such as tyre cord and other cellulose sources such as mercerised cellulose. Further examples include bagasse, *miscanthus* and bamboo.

The cellulose containing feedstock may or may not be chemically derivatized by for example carboxymethylation, carboxylation, oxidation, sulfation or esterification.

The cellulose containing feedstock may or may not be mechanically pretreated by for example cutting, delamination, high pressure homogenization, sonication or other known methods or pretreated by enzymatic hydrolysis.

However in one embodiment the cellulose containing feedstock is not chemically derivatized, not enzymatically or mechanically pretreated.

Specific examples of cellulose containing feedstock include bleached softwood pulp, micro-crystalline cellulose such as Avicel PH-101 and pulp obtained from uncoated delignified paper.

In one embodiment the weight ratio between the cellulose containing feedstock and the sum of ammonium formate and the at least one acid is for example from 0.001 to 1, preferably from 0.01 to 0.25, more preferably from 0.02 to 0.20 and even more preferably from 0.03 to 0.10.

Unless specifically mentioned otherwise, amounts of cellulose containing feedstocks are given and calculated based on their dry weight, even though they typically contain varying amounts of (residual) water.

It was found that the reaction is not very sensitive to the presence of water. As a consequence, certain amounts of water in the reaction mixture provided in step a) are tolerable.

Therefore, in one embodiment the sum of ammonium formate, the at least one acid, the cellulose containing feedstock and water is from 80 to 100 wt.-%, preferably from 90 to 100 wt % and in another embodiment from 95 to 100 wt % with regard to the total weight of the mixture provided in step a), the remainder typically being impurities from the starting materials employed.

Providing the reaction mixtures comprising the compounds set forth above may occur in any manner known to those skilled in the art, in any order of addition and in any vessel known to skilled in the art to allow the reaction as defined above.

In step b) the reaction temperature is 100° C., preferably 140° C. or more, and more preferably 155° C. or more.

In one embodiment the reaction temperature is in the range of 100° C. to 190°, preferably from 140° C. to 185° C., more preferably from 155° C. to 180° C., in particular 160° C., 170° C. or 180° C.

It is known that ammonium formate decomposes beginning at temperatures above 180° C., so higher temperatures as those mentioned before are possible but will give rise to increased formation of undesired side products such as formamide. At temperature lower than 100° C. the reaction becomes too slow to efficiently obtain the desired nanocelluloses.

The pressure conditions are not specifically limited, and the pressure in step b) may be from 500 hPa to 50 MPa, preferably from 1000 hPa to 1 MPa. Due to the potential decomposition of ammonium formate and the formation of lower boiling components like water, formic or other organic acids, however, the reaction is carried out under the pressure building up upon confining the reaction mixture in step a) and heating it up to the desired temperature i.e. under isochoric or close to isochoric conditions.

The process according to the disclosure, in particular step b) thereof, can be carried out in any vessel or reactor suitable for that purpose and known to those skilled in the art.

Preferably, the reaction is carried out in an autoclave or a reactor allowing for performance of the process under isochoric or nearly isochoric conditions.

Reaction times are for example at least 30 minutes, preferably at least 90 minutes, more preferably at least 2 hours.

In one embodiment reaction times are 60 minutes to 48 hours, preferably 90 minutes to 12 hours and even more preferably from 2 to 4 hours.

Longer reaction times are possible but virtually do not add any advantage, shorter reaction times, though possible reduce the yield of the desired nanocelluloses.

In step b) a reaction mixture comprising the desired nanocellulose is obtained. Water, formic and other acids and, where present, volatile by-products like formamide can be removed by simple washing with water and/or alcohols or by distillation, fractionation or in vacuo in order to isolate the nanocelluloses.

The nanocellulose may be re-dispersed in water by vortex mixing or sonication to form colloids, dispersions or suspensions which are also encompassed by the disclosure.

If desired formic and other acids and excess ammonium formate can be recycled to step a).

The nanocelluloses obtained by the process according to the disclosure exhibit a higher zeta potential compared to mechanically prepared nanocelluloses and a nitrogen content that is indicative for chemical modification of at least the reducing ends of at least some cellulose chains within the nanocelluloses and are thus novel and encompassed by the disclosure.

Without wanting to be bound by theory it is assumed that in step b) ammonium formate reacts with the reducing ends of at least some of the cellulose chains to form cellulose polymers comprising repeating units of formula (I) typical for cellulose as polymer of β(1,4) linked D-glucose units (I)

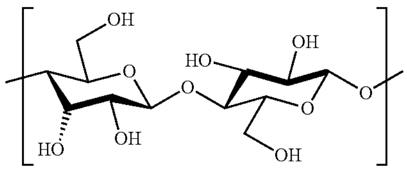

and terminal units of formula (II)

(II)

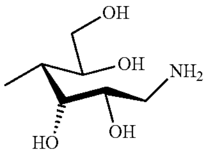

by reductive amination.

Due to the fact that the cellulose containing feedstocks depending on their origin typically contain more or less structural defects and oxygen is typically not excluded during processing and/or the performance of reaction steps a) and b), further amino groups might be introduced during reaction step b) into the cellulose chains of the nanocelluloses via reductive amination of aldehyde groups already present or produced by partial oxidation or the cellulose chains explaining the typical nitrogen contents observed for the nanocelluloses according to the disclosure as defined below.

As a macroscopic effect resulting from amination, the nanocelluloses according to the disclosure exhibit an unusually high stability when dispersed in water or as colloids. Such dispersions and colloids are stable even after two weeks of storage at room temperature without forming major amounts of gels.

The nanocelluloses further exhibit high crystallinity.

The zeta potential of the nanocelluloses according to the disclosure is typically in the range of 2.0 to 50.0 mV, preferably 5.0 to 40.0 mV and more preferably from 8.0 to 35.0 mV as measured according to the procedure described in the experimental part below.

The nitrogen content of the nanocelluloses as measured by elemental analysis according to the procedure described in the experimental part below is typically from 0.2 to 2.0 wt.-%, preferably 0.3 to 1.8 wt.-%.

The crystallinity index of the nanocelluloses as measured by X-ray diffraction according to the procedure described in the experimental part below is typically in the range of 70% to 100%, preferably 75% to 100%.

The degree of polymerization of the nanocelluloses strongly depends on the cellulose containing feedstock but typically is from 100 to 15,000 glucose units and in another embodiment from 500 to 5,000.

The nanocelluloses according to the disclosure, as well as the colloids, dispersions and suspensions comprising them are useful in a broad variety of applications. This includes their use in food and beverages for example as additives such as low-calorie additives, thickeners, stabilizers such as foam stabilizers, and texture modifiers and as microencapsulants or coatings for the protection of scents and flavors.

They are further useful in technical applications such as membranes for fuel cells and supercapacitors, as electrically conductive membranes, loudspeaker vibration films, in or as packaging materials, in water absorption or purification such as hydrogel beads for the removal of aqueous dyes, water filtration membranes, nanocomposite heavy metal sensors, aerogels, flocculants, and nanocomposite filters for groundwater mediation, as reinforcing additives for synthetic polymers such as thermoplastics and elastomers.

Further technical applications include paper/board coating and reinforcement applications, additives for paints, adhesives, latexes and cements, as stimulation, drilling, completion and spacer fluids where the novel nanocelluloses act as stabilizers, thickeners, shear thinning agents, proppants or reinforcing agents.

Other applications include their use in cosmetic or pharmaceutical compositions and in biomedical applications-such as for drug delivery, tissue engineering, bone recovery materials, biosensors, bioadhesives and microencapsulants.

The disclosure therefor also encompasses food, beverages, membranes, films, packaging materials, water absorption or purification materials, heavy metal sensors, aerogels, flocculants, reinforced synthetic polymers, paper, board, paints, adhesives, latexes, cements, stimulation fluids, drilling fluids, completion fluids, spacer fluids, cosmetic or pharmaceutical compositions, tissue and bone recovery materials, biosensors and bioadhesives comprising the nanocellulose according to the present disclosure or their colloids, suspensions or dispersions.

A major advantage of the present disclosure is the provision of a very efficient and green process for the preparation of nanocelluloses and novel nanocelluloses which allow formation of highly stable dispersions and colloids.

In the following, the present disclosure is illustrated by examples which however not intend to limit the scope of disclosure.

Experimental Section

General Information:

Materials:

Ammonium formate (≥98%) was purchased from Alfa Aesar, glycolic acid (≥98%) from Alfa Aesar, propionic acid (99.5%) from Fluca, levulinic acid (98+%) from Acros Organics, succinic acid (99.5%) from Roth, lactic acid (90 wt % solution in water) from Acros Organics.

If not indicated otherwise all chemicals were used as obtained without further purification.

Characterization.

Elemental Analysis

Elemental analysis (EA) was performed with a vario MICRO cube CHNOS Elemental Analyzer (Elementar Analysensysteme GmbH, Langenselbold) The Elements have been detected with a Thermal conductivity detector (TCD) for C, H, N and O and an infrared detector (IR) for sulfur. Each sample was measured twice and the average value was calculated.

Zeta Potential

Electrophoretic light scattering-based zeta potential was measured with a Zetasizer Nano ZS from Malvern Instruments (Malvern, United Kingdom). The wet samples after washing by centrifugation were diluted with distilled water to obtain ca. 1% (nano-) cellulose suspensions. The suspensions were placed into a disposable folded capillary cell (DTS1070). The electrophoretic mobility of the (nano-) cellulose suspensions was measured and converted to zeta potential following Smoluchowski equation using the Malvern software. For zeta potential measurements, the sample average with 95% confidence is reported from three measurements.

TEM Imaging

The Transmission Electron Microscope (TEM) imagies were recorded on Zeiss Libra 912 microscope operated at 120 kV. Negative staining with 1% uranyl acetate dissolved in distilled water was applied for a higher contrast of the images.

Crystallinity Index

The Crystallinity Index of the nanocelluloses was calculated from XRD data as a ratio between the maximum intensity of the (002) lattice diffraction (at 22.8°) and the intensity of amorphous regions in the same units (at 18.6°), see also Segal et al., Textile Research Journal, October 1959, p. 786 to 794.

II Preparation of Nanocelluloses

Experimental Procedure

A. Preparation of Low Melting Mixtures

In order to obtain the low melting mixtures used as solvent and reactant, dried ammonium formate (AF) was mixed with an organic acid in a molar ratio of 2:1. The mixture was ground in a mortar or thoroughly mixed in a glass beaker. Visual formation of the desired low melting mixture was observed when the mixture gradually liquidized under the grinding/mixing. To facilitate its formation, the mixture was kept at 60° C. under constant stirring in a sealed glass bottle for at least two hours or until the complete disappearance of crystals.

B Cellulose Containing Feedstocks Employed in the Reaction.

SP: Bleached softwood Kraft pulp obtained from Mercer Pulp disintegrated in deionized water overnight under constant stirring at room temperature.

DP: 5 g of uncoated premium delignified paper purchased from Inapa Deutschland was cut by scissors into square pieces of ca. 1 cm2 and placed into the 1 L glass bottle. 1 L of deionized water was added, and the content was mixed overnight. The pulp obtained thereby was filtered on a glass funnel filter and washed successively with deionized water and ethanol on the filter. The washed pulp was dried for 24 h at 60° C.

MC: Microcrystalline cellulose was used as commercially obtained (Avicel PH-101, cellulose content 100%)

C Reaction Conditions

The cellulose containing feedstock was added to the corresponding low melting mixture of ammonium formate and acid in a glass beaker. The resulting reaction mixture was the transferred into a Teflon® beaker. The further reaction was conducted in an autoclaved reactor under static conditions (i.e. without stirring) or under stirring as described below:

Static: The Teflon® beaker with the reaction mixture was sealed with a Teflon® cap, and placed into a stainless steel Parr reactor (autoclave). The autoclave was kept at 180° C. for 4 h. The reaction was stopped by cooling the autoclave in an ice bath, and the resulting product mixture was transferred to a glass beaker.

Stirring: The Teflon® beaker with the reaction mixture was sealed with a Teflon® gasket. The beaker was placed into the stainless steel high-pressure bench top reactor with internal stirring system. The reactor was heated to 180° C. and kept at that temperature for 4 h if not indicated otherwise in Table 1). The reaction mixture was stirred at 200 rpm. The reaction was stopped by cooling the reactor with the water cooling system. After cooling the reactor to room temperature the product mixture was transferred to a glass beaker.

The composition of the reaction mixtures, the cellulose containing feedstock employed as well as the reation conditions to prepare the nanocelluloses according to the disclosure are summarized in table 1:

TABLE 1

Composition of the reaction mixture, amount and type of cellulose containing feedstock employed and reaction conditions.

| Exp. | Amount of AF [g] | Amount of acid [g] | Acid | Mass and type of cellulose (wt %) | Reaction conditions |
|---|---|---|---|---|---|
| 1 | 15.1 | 9.1 | Glycolic acid | 1.21 g (5 wt %) MC | 180° C., 4 h, static |
| 2 | 12.6 | 7.4 | Propionic acid | 1.00 g (5 wt %) MC | 180° C., 4 h, static |
| 3 | 12.6 | 10.0 | Lactic Acid* | 1.13 g (5 wt %) MC | 180° C., 4 h, static |
| 4 | 15.1 | 13.9 | Levulinic acid | 1.45 g (5 wt %) MC | 180° C., 4 h, static |
| 5 | 15.1 | 14.2 | Succinic acid | 1.46 g (5 wt %) MC | 180° C., 4 h, static |
| 6 | 15.1 | 9.1 | Glycolic acid | 0.73 g (3 wt %) SP* | 180° C., 4 h, static |
| 7 | 12.6 | 7.4 | Propionic acid | 0.60 g (3 wt %) SP | 180° C., 4 h, static |
| 8 | 12.6 | 10.0 | Lactic Acid* | 0.68 g (3 wt %) SP | 180° C., 4 h, static |
| 9 | 15.1 | 13.9 | Levulinic acid | 0.87 g (3 wt %) SP | 180° C., 4 h, static |
| 10 | 15.1 | 14.2 | Succinic acid | 0.88 g (3 wt %) SP | 180° C., 4 h, static |
| 11 | 15.1 | 9.1 | Glycolic acid | 0.73 g (3 wt %) DP | 180° C., 4 h, static |
| 12 | 12.6 | 7.4 | Propionic acid | 0.60 g (3 wt %) DP | 180° C., 4 h, static |
| 13 | 12.6 | 10.0 | Lactic Acid* | 0.68 g (3 wt %) DP | 180° C., 4 h, static |
| 14 | 15.1 | 13.9 | Levulinic acid | 0.87 g (3 wt %) DP | 180° C., 4 h, static |
| 15 | 15.1 | 14.2 | Succinic acid | 0.88 g (3 wt %) DP | 180° C., 4 h, static |
| 16 | 45.3 | 27.3 | Glycolic acid | 3.63 g (5 wt %) MC | 180° C., 4 h, stirred |
| 17 | 45.3 | 27.3 | Glycolic acid | 3.63 g (5 wt %) MC | 180° C., 2 h, stirred |
| 18 | 45.3 | 27.3 | Glycolic acid | 3.63 g (5 wt %) MC | 180° C., 1 h, stirred |
| 19 | 45.3 | 27.3 | Glycolic acid | 3.63 g (5 wt %) MC | 160° C., 2 h, stirred |
| 20 | 45.3 | 27.3 | Glycolic acid | 3.63 g (5 wt %) MC | 140° C., 4 h, stirred |
| 21 | 45.3 | 27.3 | Glycolic acid | 3.63 g (5 wt %) MC | 140° C., 1 h, stirred |
| 22 | 45.3 | 27.3 | Glycolic acid | 2.18 g (3 wt %) SP | 180° C., 4 h, stirred |
| 23 | 45.3 | 27.3 | Glycolic acid | 2.18 g (3 wt %) SP | 180° C., 2 h, stirred |
| 24 | 45.3 | 27.3 | Glycolic acid | 2.18 g (3 wt %) SP | 180° C., 1 h, stirred |

TABLE 1-continued

Composition of the reaction mixture, amount and type of cellulose containing feedstock employed and reaction conditions.

| Exp. | Amount of AF [g] | Amount of acid [g] | Acid | Mass and type of cellulose (wt %) | Reaction conditions |
|---|---|---|---|---|---|
| 25 | 45.3 | 27.3 | Glycolic acid | 2.18 g (3 wt %) SP | 160° C., 6 h, stirred |
| 26 | 45.3 | 27.3 | Glycolic acid | 2.18 g (3 wt %) SP | 140° C., 4 h, stirred |

*Lactic Acid was employed as 90 wt % solution in water

D Washing. The product mixtures obtained according to section c) were diluted with a few mL of distilled water, mixed with a spatula, and ultra-sonicated in a laboratory sonicator for 30 minutes. Subsequent centrifugation at 10,000 RPM on a Avanti J-E centrifuge (Beckman Coulter) equipped with a JA-25.50 fixed angle rotor for 5 min precipitated the colloids, the supernatant was removed. The precipitate was washed using the following sequence: re-dispersion in water, vortexing for 30 s, ultra-sonication for 30 min, centrifugation at 10,000 RPM (20,000 RPM for last three runs) for 5 min, and decanting of the washing fluid. The procedure was repeated four times with water and twice with ethanol, until a clear washing solution was obtained. Ethanol was exchanged for water, and the samples centrifuged at 25,000 RPM, the supernatant liquid decanted and the final product freeze-dried and obtained as a white to beige powder.

The characteristics of the nanocelluloses obtained in examples 1 to 26 are summarized in Table 2.

TABLE 2

Characterization of nanocelluoses

| Exp. | ZP [mV] | C [%] | H [%] | N [%] | O [%] | Crystallinity Index [%] |
|---|---|---|---|---|---|---|
| 1 | 2.0 | 42.32 | 6.13 | 0.67 | 50.20 | 90.2 |
| 2 | 28.0 | 42.99 | 6.30 | 0.32 | 49.93 | 89.0 |
| 3 | 29.1 | 43.08 | 6.25 | 0.49 | 49.65 | 89.9 |
| 4 | 28.9 | 42.96 | 6.28 | 0.32 | 49.91 | 87.8 |
| 5 | 18.2 | 43.02 | 6.26 | 1.59 | 49.10 | 89.2 |
| 6 | 6.4 | 42.55 | 6.27 | 0.41 | 50.69 | 80.2 |
| 7 | 3.8 | 42.32 | 6.195 | 0.34 | 50.30 | 78.3 |
| 8 | 14.1 | 42.32 | 6.27 | 0.26 | 50.39 | 79.2 |
| 9 | 5.8 | 42.18 | 6.305 | 0.28 | 50.43 | 78.4 |
| 10 | 33.8 | 42.23 | 6.27 | 0.28 | 50.44 | 77.9 |
| 11 | 26.1 | 42.50 | 6.61 | 0.37 | 50.46 | 79.7 |
| 12 | 6.9 | 42.42 | 6.64 | 0.31 | 50.63 | 77.0 |
| 13 | 24.9 | 42.48 | 6.63 | 0.32 | 50.51 | 77.4 |
| 14 | 5.2 | 42.62 | 6.75 | 0.33 | 50.30 | 77.9 |
| 15 | 8.7 | 42.70 | 5.96 | 1.59 | 49.14 | 78.9 |
| 16 | 21.5 | 42.39 | 6.28 | 0.35 | 50.94 | 73.0 |
| 17 | 34.4 | 42.37 | 6.32 | 0.43 | 50.84 | 73.8 |
| 18 | 31.9 | 41.93 | 6.20 | 0.40 | 51.42 | 77.3 |
| 19 | 34.6 | 41.95 | 6.23 | 0.35 | 51.41 | 82.0 |
| 20 | 33.9 | 41.75 | 6.02 | 0.36 | 51.76 | 79.0 |
| 21 | 35.9 | 42.03 | 6.23 | 0.28 | 51.39 | 79.2 |
| 22 | 29.6 | 41.93 | 6.15 | 0.28 | 51.61 | 82.4 |
| 23 | 26.2 | 41.95 | 6.22 | 0.27 | 51.53 | 83.6 |
| 24 | 32.2 | 42.25 | 6.29 | 0.32 | 50.98 | 81.5 |
| 25 | 28.2 | 41.98 | 6.24 | 0.32 | 51.41 | 83.1 |
| 26 | 35.6 | 41.93 | 6.39 | 0.26 | 51.20 | 83.3 |

All nanocelluloses obtained according to the disclosure show high stability of their aqueous colloids for at least two weeks clearly indicating additional stabilization through the formation of amino groups at the reducing ends of the cellulose chains which causes increased nitrogen levels in the nanocelluloses according to the disclosure.

The invention claimed is:

1. A process for the preparation of nanocellulose comprising at least the steps of a) providing a mixture comprising i) ammonium formate ii) at least one acid and iii) at least one cellulose containing feedstock b) heating the mixture provided in step a) at a reaction temperature of 100° C. or more.

2. The process according to claim 1, wherein the nanocellulose represents polymer particles comprising β(1,4) linked D-glucose units having an average degree of polymerization of at least 50 D-glucose units with at least one dimension being smaller than 1000 nm and being chemically derivatized or not.

3. The process according to claim 1, wherein the at least one acid comprises organic compounds bearing one, two or three carboxylic acid (—COOH) or sulfonic acid groups and inorganic acids selected from the group consisting of sulfuric acid, hydrohalic acids, perhalic acids and phosphoric acid.

4. The process according to claim 1, wherein at least one acid is a mono- and dicarboxylic acid selected from the group consisting of formic acid, acetic acid, propionic acid, glycolic acid, lactic acid, oxalic acid, levulinic acid, malonic acid, succinic acid, malic acid, maleic acid and adipic acid.

5. The process according to claim 1, wherein the molar ratio between ammonium formate and the sum of acids is from 0.2 to 1000.

6. The process according to claim 1, wherein the cellulose containing feedstock is selected from the group consisting of microcrystalline cellulose, microbial cellulose, cellulose derived from marine or other invertebrates, recycling or waste paper, wood pulp, chemical (dissolving) pulp, delignified pulp, pulp rejects, native biomass in the form of plant fibres, wood chips, saw dust, straw, leaves, stems or husks, cellulosic synthetic fibres and other cellulose sources.

7. The process according to claim 1, wherein the cellulose containing feedstock is chemically derivatized by carboxymethylation, carboxylation, oxidation, sulphation or esterification or not chemically derivatized.

8. The process according to claim 1, wherein the cellulose containing feedstock is mechanically pretreated by cutting, delamination, high pressure homogenization, sonication or other known methods or is pretreated by enzymatic hydrolysis.

9. The process according to claim 1, wherein the weight ratio between the cellulose containing feedstock calculated on its dry weight and the sum of ammonium formate and the at least one acid is from 0.001 to 1.

10. The process according to claim 1, wherein the sum of ammonium formate, the at least one acid, the cellulose containing feedstock and water is from 80 to 100 wt.-% with regard to the total weight of the mixture provided in step a).

11. The process according to claim 1, wherein in step b) the reaction temperature is in the range of 100° C. to 190° C.

12. The process according to claim 1, wherein the nanocelluloses are isolated from the reaction mixture obtained in step b) by washing with water and/or alcohols or by removal of volatiles by distillation, fractionation or in vacuo.

13. The process according to claim 1, wherein formic and other acids and excess ammonium formate, where present are recycled into step a).

14. Nanocellulose comprising at least some cellulose polymers comprising repeating units of formula (I)

(I)

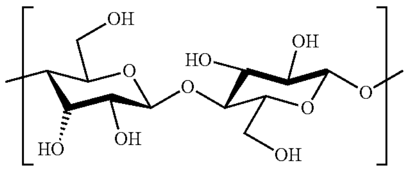

and terminal units of formula (II)

(II)

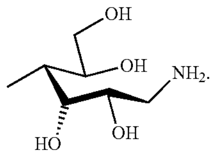

15. Nanocellulose according to claim 14, comprising further amino groups obtained via reductive amination of aldehyde groups already present or produced by partial oxidation of the cellulose polymer.

16. Nanocellulose according to claim 14 having a zeta potential of 2.0 to 50.0 mV.

17. Nanocellulose according to claim 14 having a nitrogen content of 0.2 and 2.0 wt.-%.

18. Nanocellulose according to claim 14 having a crystallinity index as measured by X-ray diffraction in the range of 70% to 100%.

19. Nanocellulose according to claim 14 having a degree of polymerization of 100 to 15,000 glucose units or 500 to 5,000 glucose units.

20. Food, beverages, membranes, films, packaging materials, water absorption or purification materials, heavy metal sensors, aerogels, flocculants, reinforced synthetic polymers, paper, board, paints, adhesives, latexes, cements, stimulation fluids, drilling fluids, completion fluids, spacer fluids, cosmetic or pharmaceutical compositions, tissue and bone recovery materials, biosensors and bioadhesives comprising nanocellulose according to claim 14.

* * * * *